United States Patent
Beck et al.

(10) Patent No.: US 7,816,625 B2
(45) Date of Patent: Oct. 19, 2010

(54) METHOD FOR THE PRODUCTION OF A HOLE AND DEVICE

(75) Inventors: Thomas Beck, Panketal (DE); Georg Bostanjoglo, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 967 days.

(21) Appl. No.: 10/574,724

(22) PCT Filed: Sep. 2, 2004

(86) PCT No.: PCT/EP2004/009793

§ 371 (c)(1),
(2), (4) Date: Apr. 6, 2006

(87) PCT Pub. No.: WO2005/044508

PCT Pub. Date: May 19, 2005

(65) Prior Publication Data

US 2007/0119832 A1    May 31, 2007

(30) Foreign Application Priority Data

Oct. 6, 2003 (EP) .................................. 03022635
Oct. 29, 2003 (EP) .................................. 03024966

(51) Int. Cl.
*B23K 26/00* (2006.01)
*B23K 26/06* (2006.01)
(52) U.S. Cl. ............................. 219/121.71; 219/121.73
(58) Field of Classification Search .. 219/121.6–121.86
See application file for complete search history.

(56) References Cited

U.S. PATENT DOCUMENTS

| | | | |
|---|---|---|---|
| 5,073,687 A | 12/1991 | Inagawa et al. | |
| 5,683,600 A * | 11/1997 | Kelley et al. | 219/121.71 |
| 5,841,099 A * | 11/1998 | Owen et al. | 219/121.69 |
| 5,939,010 A | 8/1999 | Yuyama et al. | |
| 6,054,673 A | 4/2000 | Chen | |
| 6,172,331 B1 | 1/2001 | Chen | |
| 6,359,254 B1 | 3/2002 | Brown | |
| 6,479,788 B1 | 11/2002 | Arai et al. | |
| 6,541,731 B2 * | 4/2003 | Mead et al. | 219/121.7 |
| 6,573,474 B1 * | 6/2003 | Loringer | 219/121.71 |
| 6,630,645 B2 * | 10/2003 | Richter et al. | 219/121.71 |
| 6,809,291 B1 * | 10/2004 | Neil et al. | 219/121.76 |
| 6,864,459 B2 * | 3/2005 | Chang et al. | 219/121.71 |
| 2004/0169022 A1 * | 9/2004 | Mega et al. | 219/121.64 |
| 2004/0173942 A1 * | 9/2004 | Kobayashi et al. | 264/400 |

FOREIGN PATENT DOCUMENTS

| | | |
|---|---|---|
| DE | 100 63 309 A1 | 7/2002 |
| EP | 1 386 689 A1 | 2/2004 |
| JP | 05 138380 A | 6/1993 |
| WO | WO 02/092276 A1 | 11/2002 |

* cited by examiner

Primary Examiner—Sang Y Paik (57) ABSTRACT

Previous methods for the production of a hole in a component are very time-consuming and expensive, as special lasers having ultra short laser pulse lengths are used. The inventive method varies laser pulse lengths and ultra short laser pulse lengths are used exclusively in the region which is to be removed, wherein it is possible to have a noticeable influence on through flow and/or out-flow behavior. This, for example, the inner surface of a diffuser of a hole, which can be produced in a precise manner using ultra short laser pulse lengths.

16 Claims, 8 Drawing Sheets

METHOD FOR THE PRODUCTION OF A HOLE AND DEVICE

CROSS REFERENCE TO RELATED APPLICATIONS

This application is the US National Stage of International Application No. PCT/EP2004/009793, filed Sep. 2, 2004 and claims the benefit thereof. The International Application claims the benefits of European application No. 03022635.1 filed Oct. 6, 2003 and European application No. 03024966.8 filed Oct. 29, 2003, all of the applications are incorporated by reference herein in their entirety.

FIELD OF THE INVENTION

The invention relates to a process for producing a hole as described in the claims, in which a hole is produced in a component by at least one laser and pulsed laser beams, and to an apparatus for carrying out the process as described in the claims.

BACKGROUND OF THE INVENTION

With many components, in particular castings, material has to subsequently be removed, for example to form recesses or through-holes. In particular in the case of turbine components, which have film-cooling holes for cooling purposes, holes are introduced retrospectively following production of the component.

Turbine components of this type often also have layers, such as for example a metallic interlayer and/or a ceramic outer layer. The film-cooling holes then have to be produced through the layers and the substrate (casting).

U.S. Pat. No. 6,172,331 and U.S. Pat. No. 6,054,673 disclose a laser drilling method for introducing holes into layer systems in which ultrashort laser pulse lengths are used. A laser pulse length is searched for within a defined laser pulse length range and used to produce the hole.

DE 100 63 309 A1 discloses a process for producing a cooling air opening by means of a laser, in which the laser parameters are set in such a way that material is removed by sublimation.

The use of ultrashort laser pulses of this type is expensive and very time-consuming on account of their low mean powers.

SUMMARY OF THE INVENTION

Therefore, it is an object of the invention to overcome this problem.

The object is achieved by the process as claimed in the claims, in which different laser pulse lengths are used.

It is particularly advantageous if short laser pulse lengths are used only in one of the first process steps in order to produce optimum properties in an outer upper region of the cut surface, since these properties are crucial for the behaviour of a medium as it flows out of the hole and for the properties of a medium as it flows around this hole. The properties of the cut surface are less critical in the interior of the hole, and consequently longer laser pulse lengths, which can cause inhomogeneous cut surfaces, can be used there.

A further object is to provide an apparatus with which the process can be carried out quickly and easily. This object is achieved by the apparatus as claimed in the claims.

The subclaims list further advantageous measures of the process.

The measures listed in the subclaims can be combined with one another in an advantageous way.

BRIEF DESCRIPTION OF THE DRAWINGS

The invention is explained in more detail with reference to the figures, in which.

DETAILED DESCRIPTION OF THE INVENTION

Figure 1:
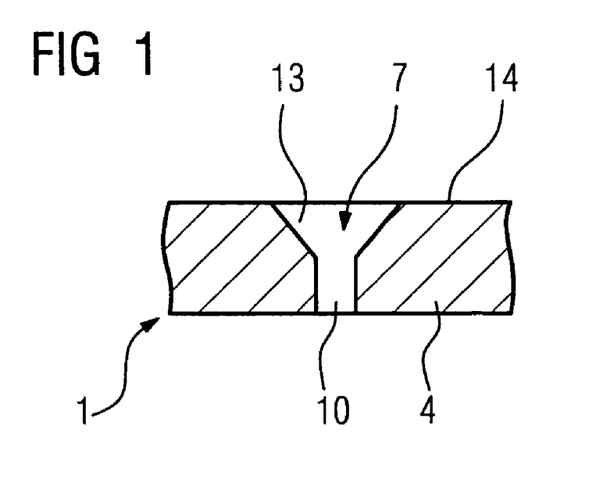
FIG. 1 shows a hole in a substrate.

FIG. 1 shows a component 1 with a hole 7. The component 1 comprises a substrate 4 (for example a casting). The substrate 4 may be metallic and/or ceramic. In particular in the case of turbine components, such as for example turbine rotor blades 120 (FIGS. 10, 11) or turbine guide vanes 130 (FIG. 11), combustion chamber linings 155 (FIG. 12) and other housing parts of a steam or gas turbine 100 (FIG. 11, but also aircraft turbine), the substrate 4 consists of a nickel-base, cobalt-base or iron-base superalloy.

The substrate 4 has a hole 7 which is, for example, a through-hole. It may also be a blind hole.

The hole 7 comprises a lower region 10 in a lower region of the hole 7, which is, for example, symmetrical and, for example, also circular in form, and a diffusor 13 at a surface 14 of the substrate 4. The diffusor 13 constitutes, for example, a widening in the cross section with respect to the part 10 of the hole 7. The hole 7 is, for example, a film-cooling hole. In particular the inner surface of the diffusor 13 should be flat in order to allow a medium to flow out of the hole 7 in an optimum way.

Figure 2:
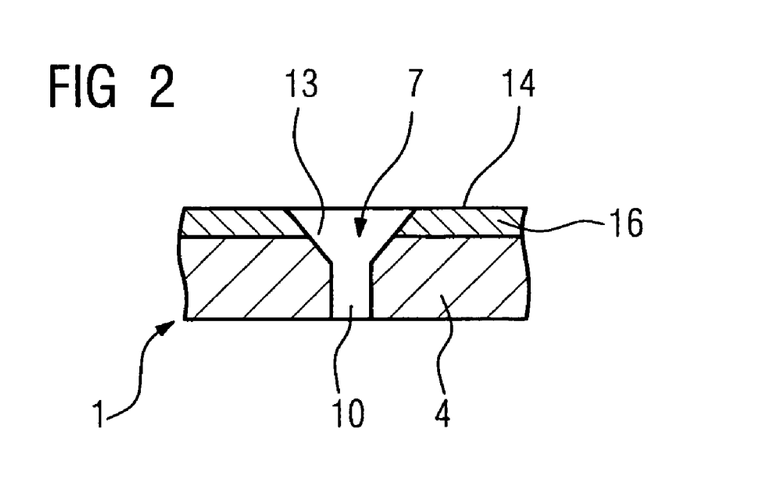
FIG. 2 shows a hole in a layer system.

FIG. 2 shows a component 1 which is designed as a layer system. At least one layer 16 is present on the substrate 4. This may, for example, be a metallic alloy of type MCrAlX, where M stands for at least one element selected from the group consisting of iron, cobalt and nickel. X stands for yttrium and/or at least one rare earth element. The layer 16 may also be ceramic.

A further layer (not shown), for example a ceramic layer, in particular a thermal barrier coating, may also be present on the layer 16. The thermal barrier coating is, for example, a completely or partially stabilized zirconium oxide layer, in particular an EB-PVD layer or a plasma-sprayed (APS, LPPS, VPS) layer.

A hole 7 comprising the two subregions 10 and 13 is likewise introduced into this layer system.

The statements which have been made in connection with the production of the hole 7 apply to substrates 4 both with and without layer or layers.

Figure 3:
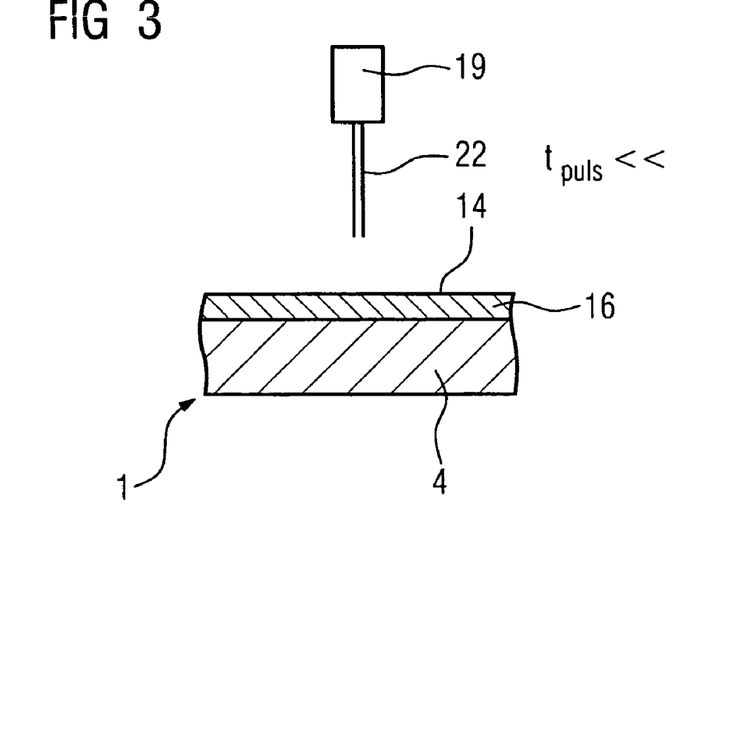
FIGS. 3, 4, 5, 6, 7, 8, 9 show process steps of the process according to the invention.
Figure 4:
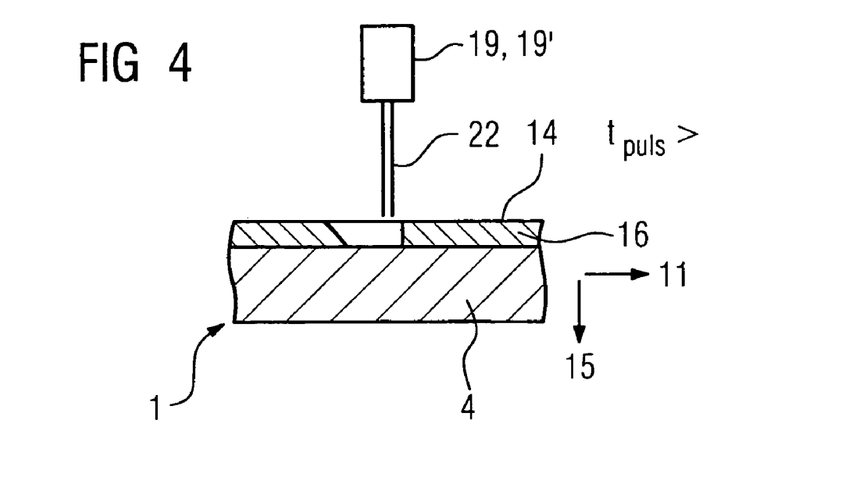

FIGS. 3 and 4 show process steps of the process according to the invention. According to the invention, different laser pulse lengths are used during the process, in particular very short laser pulse lengths of less than 100 ns (nanoseconds), in particular less than 50 ns, are used in one of the first process steps. It is also possible to use laser pulse lengths of less than picoseconds or femtoseconds.

If very short laser pulse lengths of less than 100 ns, in particular less than 50 ns, are used, virtually no fusion occurs in the region of the cut surface. Therefore, no cracks are formed there and consequently accurate geometries can be produced.

Figure 7:
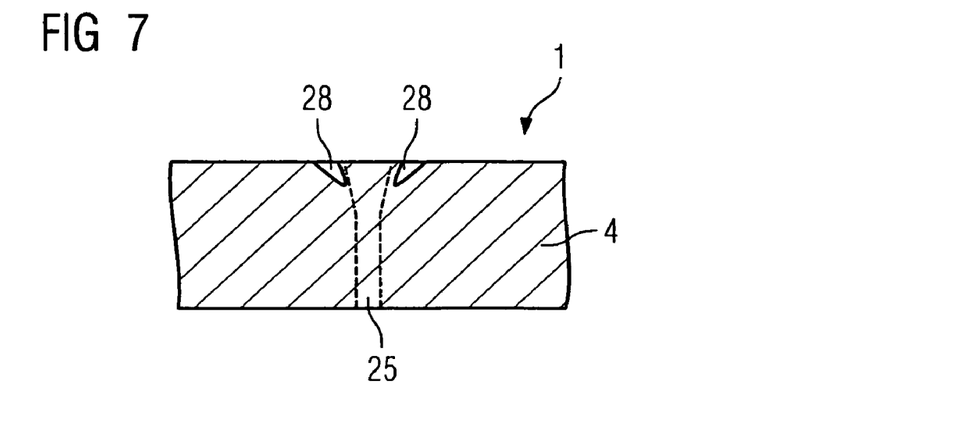
Figure 8:
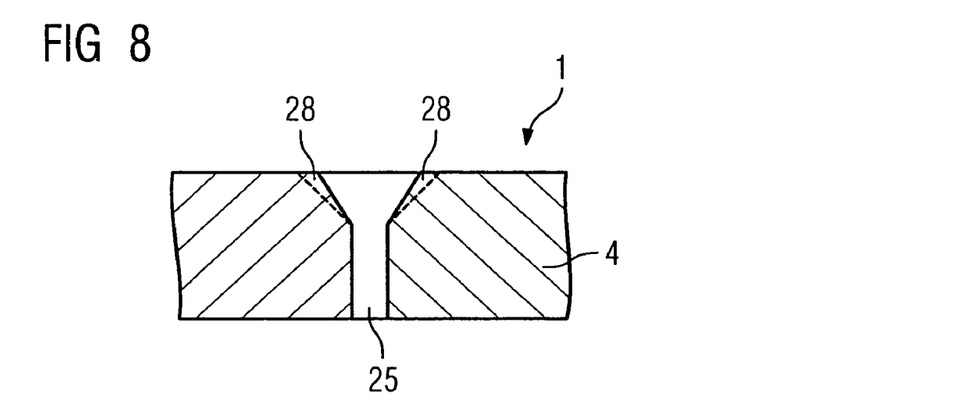

In one of the first process steps, a first subregion of the hole 7 is produced in the component 1. This can at least partially or completely correspond to the diffusor 13 (FIGS. 4, 7, 8).

In particular, although not necessarily, when a metallic interlayer or the metallic substrate 4 is reached, laser pulse lengths of greater than 50 ns, in particular greater than 100 ns and in particular up to 10 ms are used to produce the remaining (second) subregion 10 of the hole 7, as illustrated in FIG. 1 or 2.

The laser pulse lengths of a single laser 19 can be altered continuously, for example from the start of the process to the end of the process. The start of the process begins with the removal of material at the outer surface 14, and the end of the process concludes at the depth of the hole 7. The material is, for example, removed in layers in a plane 11 (FIG. 6) and in an axial direction 15.

The process can be applied to newly produced components 1 which have been cast for the first time.

The process can also be used with components 1 which are to be refurbished. Refurbishment means that components 1 which have been used by way of example have layers removed and, after repair, such as for example filling of cracks and removal of oxidation and corrosion products, are newly coated again. In this case, by way of example, impurities or coating material which has been reapplied (FIG. 7) and has entered the holes 7 is removed using a laser 19, 19'.

In the process, it is possible to use at least two or more lasers 19, 19', which by way of example are deployed in succession. The various lasers 19, 19' have different ranges of laser pulse lengths. For example, a first laser 19 may generate laser pulse lengths of less than 100 ns, in particular less than 50 ns, and a second laser 19' may generate laser pulse lengths of greater than 50 ns, in particular greater than 100 ns. To produce a hole 7, the first laser 19 is deployed first of all. Then, the second laser 19' is used for the further processing.

Figure 5:
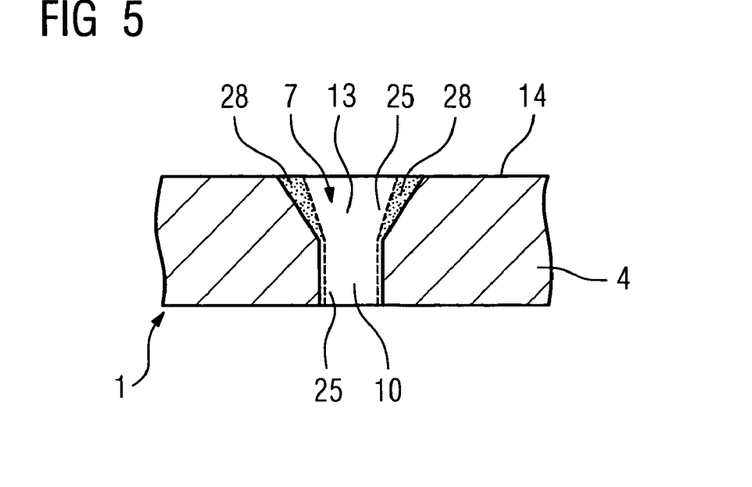

FIG. 5 shows a cross section through a hole 7. In this case too, the process involves first of all rough machining with laser pulse lengths of greater than 50 ns, in particular greater than 100 ns, and precision machining with laser pulse lengths of less than 100 ns, in particular less than 50 ns.

The lower subregion 10 of the hole 7 is machined completely, and the region of the diffusor 13 almost completely, using a laser which has laser pulse lengths of greater than 50 ns, in particular greater than 100 ns. To complete the hole 7 or the diffusor 13, all that is then required is for a thin upper region 28 in the region of the diffusor 13 to be machined by means of a laser 19, 19' which can generate laser pulse lengths of less than 100 ns, in particular less than 50 ns.

Figure 6:
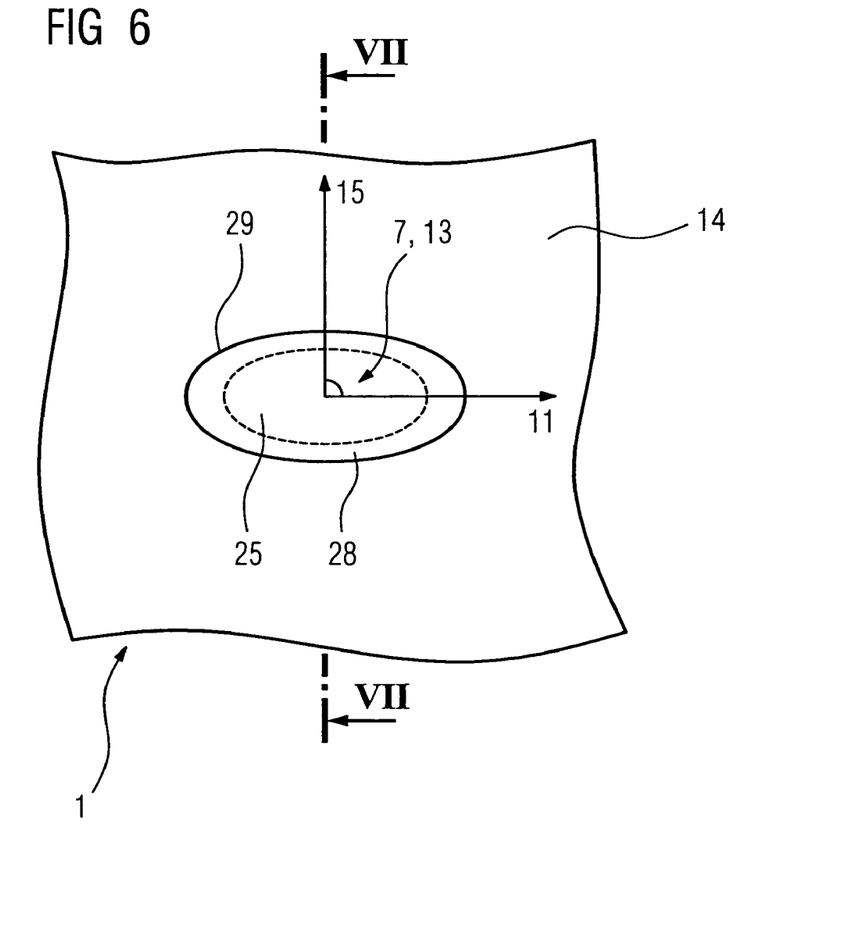

FIG. 6 shows a plan view of a hole 7 in the component 1. The different lasers 19, 19' or the different laser pulse lengths of these lasers 19, 19' are used in different process steps.

First of all, for example, rough machining is carried out using long laser pulse lengths (>50 ns, in particular >100 ns). This produces the majority of the hole 7. This inner region is denoted by reference numeral 25. Only an outer upper region 28 of the hole 7 or the diffusor 13 then has to be removed in order to achieve the final dimensions of the hole 7 (FIG. 8, the outer upper region 28 is indicated by dashed lines). Only when the outer upper region 28 has been machined by means of a laser 19, 19' with very short laser pulse lengths (<100 ns, in particular <50 ns) is the hole 7 or the diffusor 13 complete. The contour 29 of the diffusor 13 is therefore produced using very short laser pulse lengths, i.e. with the result that the outer upper region 28 is removed and is therefore free of cracks and fusion. The material is, for example, removed in a plane 11 (perpendicular to the axial direction 15).

One alternative for the production of the hole 7 consists in first of all producing the outer upper region 28 using short laser pulse lengths (<100 ns) down to a depth in the axial direction 15 which partially or completely corresponds to the extent of the diffusor 13 of the hole 7 in this direction 15 (FIG. 7, the inner region 25 is indicated by dashed lines). As a result, virtually no fusion is produced in the region of the cut surface of the diffusor 13, and no cracks are formed there, with the result that accurate geometries can be produced. Only then is the inner region 25 removed using longer laser pulse lengths (>50 ns, in particular >100 ns).

Figure 9:
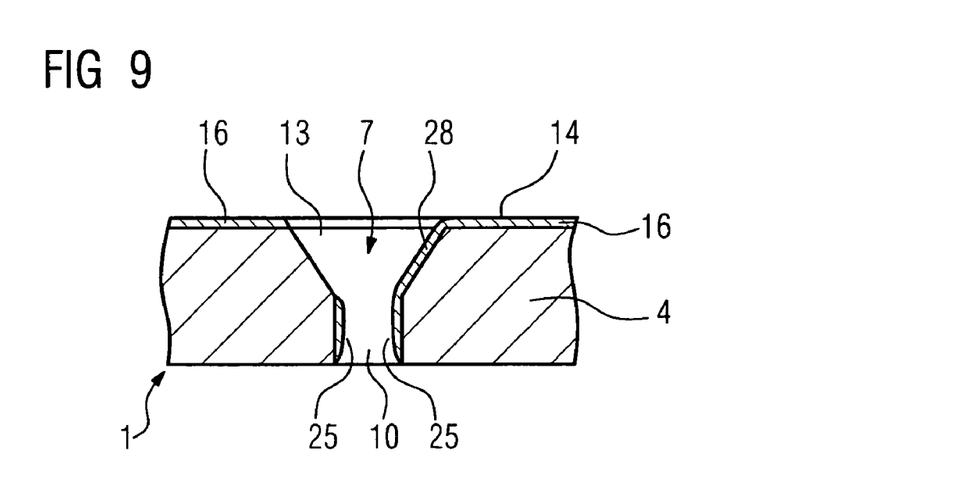

FIG. 9 shows the remachining (refurbishment) of a hole 7, in which case, during coating of the substrate 4 with the material of the layer 16, material has penetrated into the existing hole 7. By way of example, the deeper regions in the region 10 of the hole 7 can be machined using a laser which has laser pulse lengths of greater than 50 ns, in particular greater than 100 ns. These regions are denoted by 25. The more critical upper region 28, for example in the region of the diffusor 13, on which contamination is present, is machined using a laser 19' which has laser pulse lengths of less than 100 ns, in particular less than 50 ns.

Figure 10:
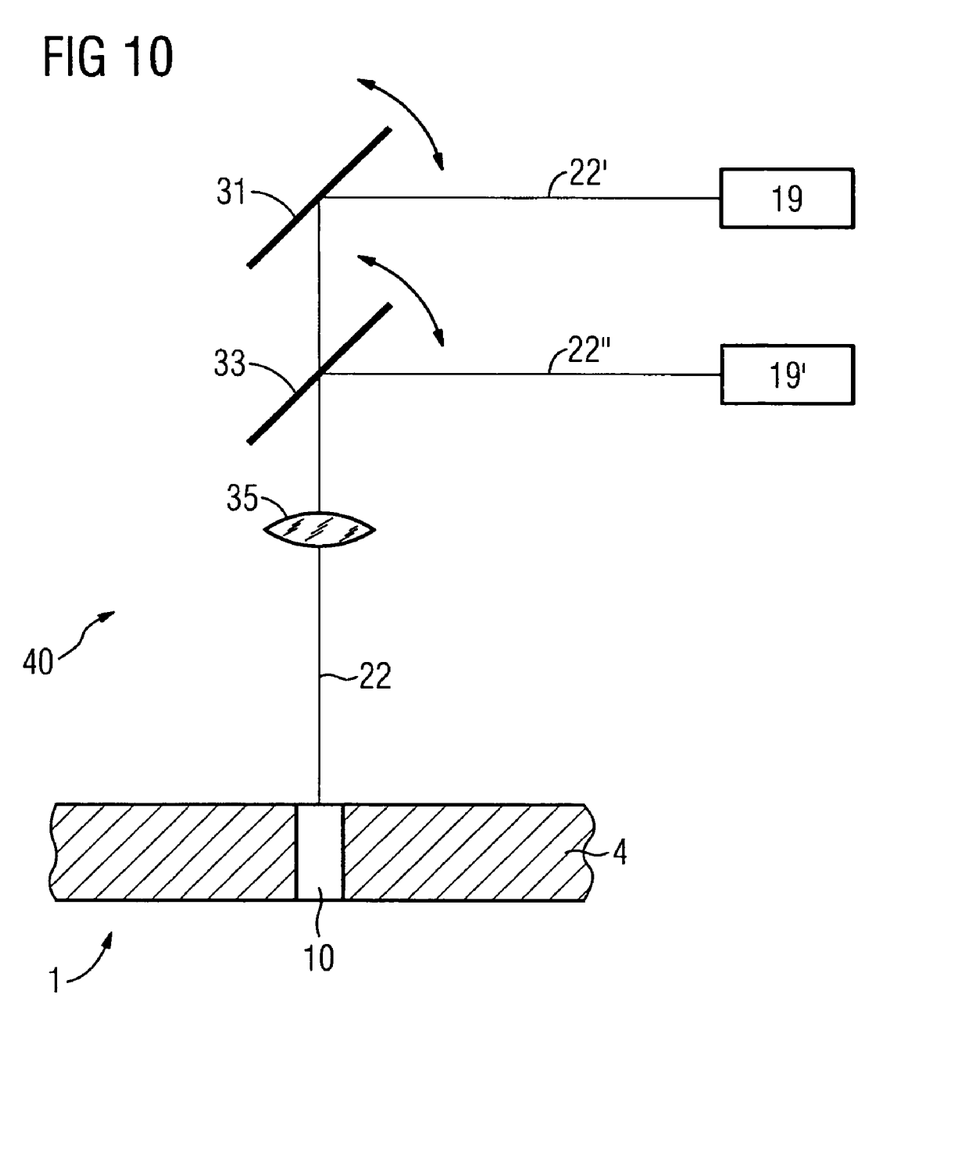
FIG. 10 shows an apparatus for carrying out the process.

FIG. 10 shows, by way of example, an apparatus 40 according to the invention for carrying out the process according to the invention. The apparatus 40 comprises, for example, at least one optical system 35, in this case one optical system 35, in particular a lens, which diverts a laser beam 22 onto the substrate 4 in order to produce the through-hole 10.

At least two lasers 19, 19' are used. The laser beams 22', 22" can be passed via mirrors 31, 33 to the optical system 35. The mirrors 31, 33 are displaceable or rotatable, so that in each case only one laser 19, 19' emits its laser beams 22' or 22" via the mirrors 31 or 33 and the lens 35 onto the component 1.

It is also possible for the laser beams 22' or 22" to be simultaneously guided onto the component via one optical system or two or more optical systems if different regions are being removed in one plane. By way of example, the outer region 28 can be produced using short laser pulse lengths and the inner region 25 using longer laser pulse lengths at the same time.

The lasers 19, 19' may have wavelengths of 1064 nm or 532 nm. The lasers 19, 19' may have different wavelengths. Likewise, by way of example, the laser 19 has pulse lengths of 0.05-5 ms; by contrast, the laser 19' has pulse lengths of 50-500 ns.

Therefore, by displacing the mirrors 31, 33, it is possible for the respective laser 19, 19' with its corresponding laser pulse lengths which are required in order for example to produce the outer upper region 28 or the inner region 25 to be introduced onto the component 1 via the optical system 35.

Both the mirrors 31, 33, the optical system or the substrate 4 can be displaced in such a way that material is removed from the surface of the substrate 4 as shown in FIGS. 3 to 9. If, for example, the outer upper region 28 is produced first of all, as shown in FIG. 6, the laser with the short laser pulse lengths 19' is introduced. If the inner region 25 is then produced, the laser 19' is decoupled by movement of the mirror 33, and the laser 19 with its longer laser pulse lengths 10 is introduced by movement of the mirror 31.

Figure 11:
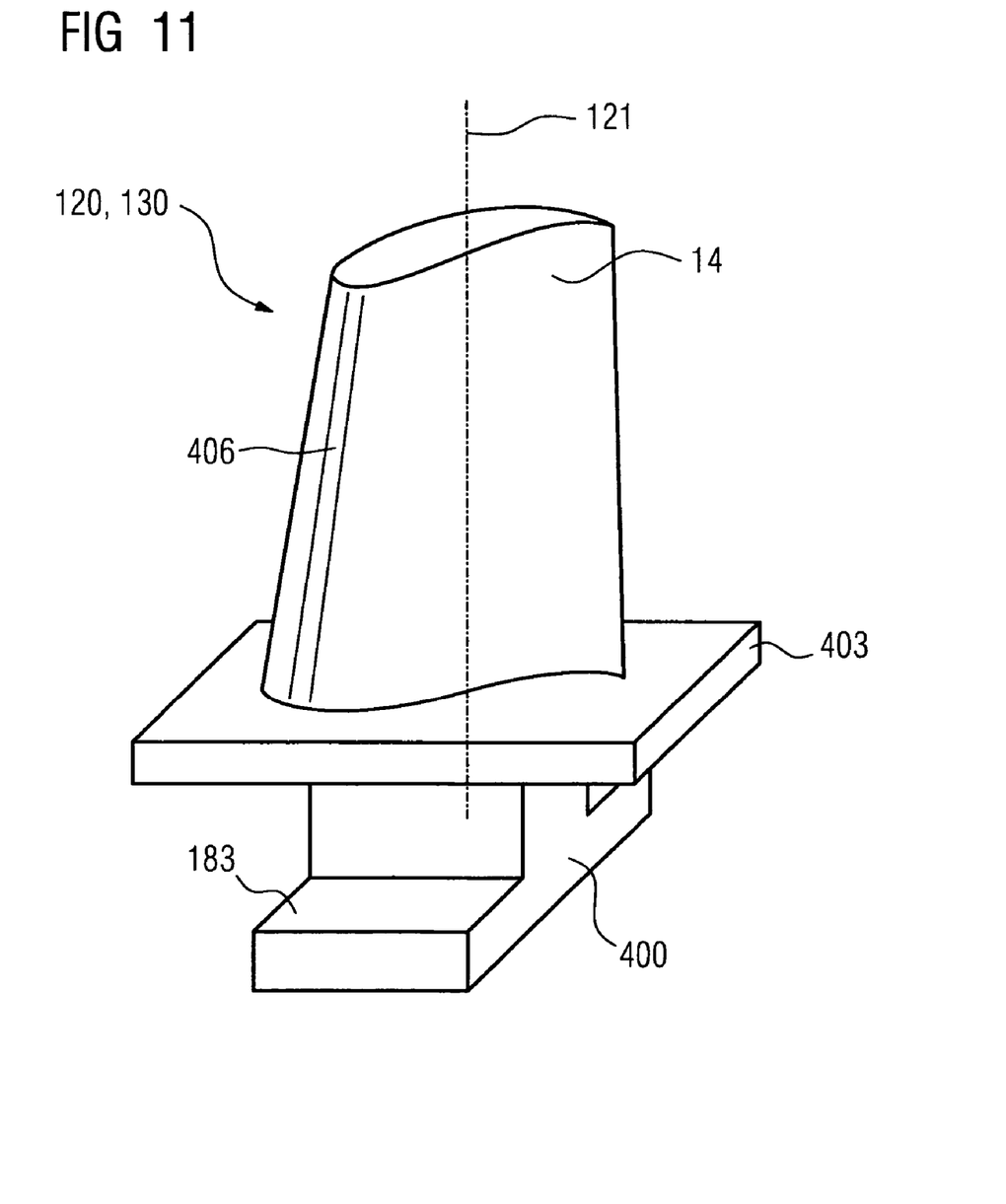
FIG. 11 shows a turbine blade or vane.

FIG. 11 shows a perspective view of a blade or vane 120, 130, which extends along a longitudinal axis 121 into which, for example, film-cooling holes, for example having a diffusor 13, are to be introduced.

The blade or vane 120, 130 has, in succession along the longitudinal axis 121, a securing region 400, an adjoining blade or vane platform 403 and a main blade or vane region 406. A blade or vane root 183, which is used to secure the rotor blades 120, 130 to the shaft, is formed in the securing region 400. The blade or vane root 183 is configured as a hammer head. Other configurations, for example as a fir-tree root or dovetail root are also possible. In the case of conventional blades or vanes 120, 130, solid metallic materials are used in all regions 400, 403, 406 of the rotor blade 120, 130. The rotor blade 120, 130 may in this case be produced by a casting process, by a forging process, by a milling process or by combinations thereof.

Figure 12:
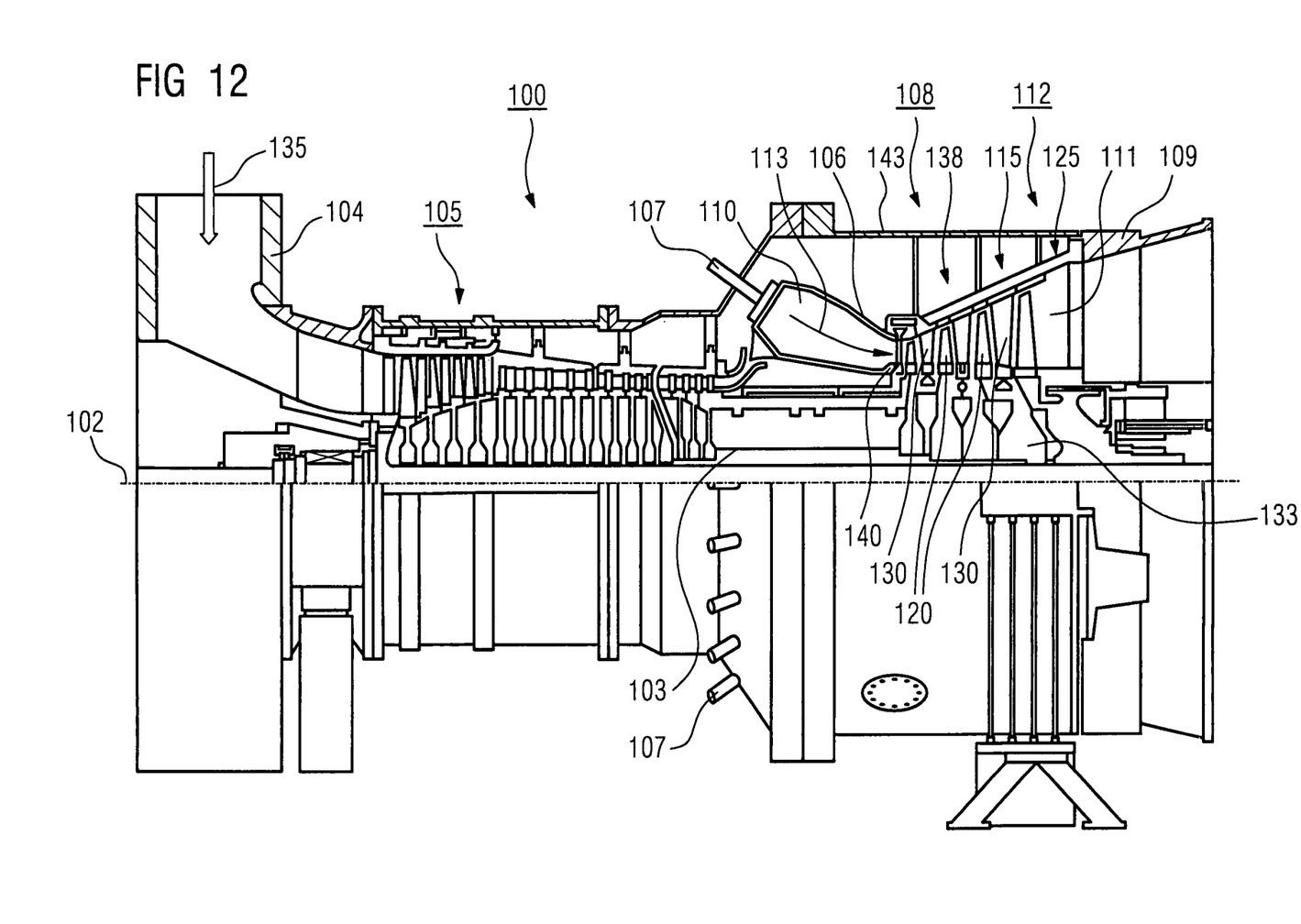
FIG. 12 shows a gas turbine.

FIG. 12 shows, by way of example, a gas turbine 100 in longitudinal part section. In the interior, the gas turbine 100 has a rotor 103 which is mounted so as to rotate about an axis of rotation 102 and is also referred to as the turbine rotor. An intake casing 104, a compressor 105, a, for example, torroidal combustion chamber 110, in particular an annular combustion chamber 106, with a plurality of coaxially arranged burners 107, a turbine 108 and the exhaust-gas casing 109 follow one another along the rotor 103. The annular combustion chamber 106 is in communication with a, for example, annular hot-gas duct 111. There, by way of example, four turbine stages 112 connected in series form the turbine 108. Each turbine stage 112 is formed from two blade or vane rings. As seen in the direction of flow of a working medium 113, a row 125 of rotor blades 120 follows a row 115 of guide vanes in the hot-gas duct 111.

The guide vanes 130 are in this case secured to an inner housing 138 of a stator 143, whereas the rotor blades 120 of a row 125 are arranged on the rotor 103 by means of a turbine disk 133. A generator (not shown) is coupled to the rotor 103.

While the gas turbine 100 is operating, the compressor 105 sucks in air 135 through the intake casing 104 and compresses it. The compressed air which is provided at the turbine-side end of the compressor 105 is passed to the burners 107, where it is mixed with a fuel. The mixture is then burnt, forming the working medium 113 in the combustion chamber 110. From there, the working medium 113 flows along the hot-gas duct 111 past the guide vanes 130 and the rotor blades 120. The working medium 113 expands at the rotor blades 120 in such a manner as to transfer its momentum, so that the rotor blades 120 drive the rotor 103 and the latter drives the generator coupled to it.

When the gas turbine 100 is operating, the components exposed to the hot working medium 113 are subject to thermal stresses. The guide vanes 130 and rotor blades 120 of the first turbine stage 112, as seen in the direction of flow of the working medium 113, together with the heat shield bricks which line the annular combustion chamber 106, are subject to the highest thermal stresses. To be able to withstand the temperatures prevailing there, these components are cooled by means of a cooling medium.

The substrates may also have a directional structure, i.e. they are single-crystalline (SX structure) or have only longitudinally oriented grains (DS structure). Iron-base, nickel-base or cobalt-base superalloys are used as the material.

The blades or vanes 120, 130 may also have coatings to protect against corrosion (MCrAlX; M is at least one element selected from the group consisting of iron (Fe), cobalt (Co), Nickel (Ni), X stands for yttrium (Y) and/or at least one rare earth element) and to protect against heat by means of a thermal barrier coating. The thermal barrier coating consists, for example, of $Zr,O2$, $Y2O4-ZrO2$, i.e. it is unstabilized, partially stabilized or completely stabilized by yttrium oxide and/or calcium oxide and/or magnesium oxide. Columnar grains are produced in the thermal barrier coating by suitable coating processes, such as for example electron beam physical vapor deposition (EB-PVD).

The guide vane 130 has a guide vane root (not shown here) facing the inner casing 138 of the turbine 108 and a guide vane head at the opposite end from the guide vane root. The guide vane head faces the rotor 103 and is fixed to a securing ring 140 of the stator 143.

Figure 13:
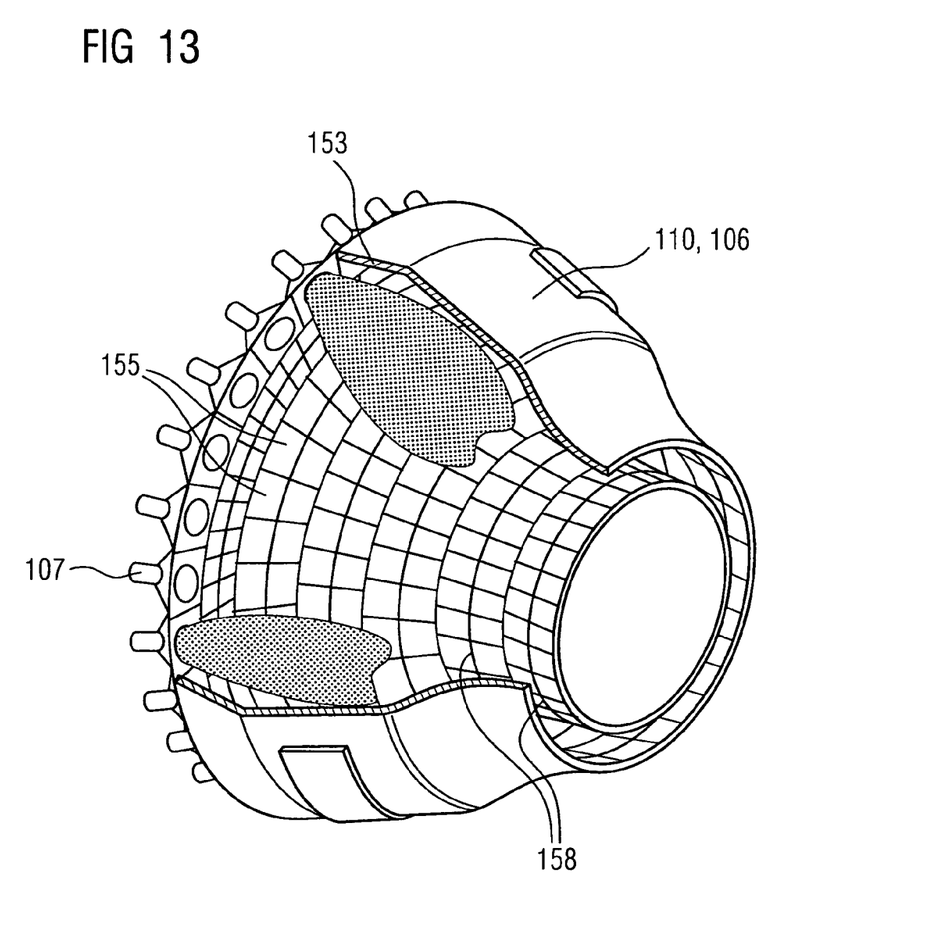
FIG. 13 shows a combustion chamber.

FIG. 13 shows a combustion chamber 110 of a gas turbine 100. The combustion chamber 110 is configured, for example, as what is known as an annular combustion chamber, in which a multiplicity of burners 102, which are arranged around the turbine shaft 103 in the circumferential direction, open out into a common combustion chamber space. For this purpose, the combustion chamber 110 as a whole is configured as an annular structure which is positioned around the turbine shaft 103.

To achieve a relatively high efficiency, the combustion chamber 110 is designed for a relatively high temperature of the working medium M of approximately 1000° C. to 1600° C. To allow a relatively long operating time even under these operating parameters, which are unfavorable for the materials, the combustion chamber wall 153 is provided, on its side which faces the working medium M, with an inner lining formed from heat shield elements 155. On the working medium size, each heat shield element 155 is equipped with a particularly heat-resistant protective layer or is made from material that is able to withstand high temperatures. Moreover, on account of the high temperatures in the interior of the combustion chamber 110, a cooling system is provided for the heat shield elements 155 and/or for their holding elements. The heat shield elements 155 may also have holes 7, for example also including a diffusor 13, in order to cool the heat shield element 155 or to allow combustible gas to flow out.

The materials of the combustion chamber wall and the coatings thereof may be similar to those of the turbine blades or vanes.

The combustion chamber 110 is designed in particular to detect losses of the heat shield elements 155. For this purpose, a number of temperature sensors 158 are positioned between the combustion chamber wall 153 and the heat shield elements 155.

The invention claimed is:

1. A method for producing a hole in a superalloy metal turbine component by pulsed laser beams, wherein the hole comprises a first region and a second region, the method comprising:

using a plurality of pulses of longer laser pulse length for rough machining the hole to produce an inner region of the hole;

using a plurality of pulses of shorter laser pulse length for removing an outer upper region of the hole to produce the first region; and using the plurality of pulses of longer laser pulse length to remove remaining first region material and to produce the second region, wherein the inner region is removed using the plurality of pulses of longer laser pulse length after producing the first region, and wherein the first region comprises a wider cross section than the second region.

2. A method for producing a hole in a component by pulsed laser beams, wherein the hole comprises a first region and a second region, the method comprising:

using a plurality of pulses of longer laser pulse length for rough machining the hole to produce an inner region of the hole generating a plurality of laser beams with different laser pulse lengths;

using a plurality of pulses of shorter laser pulse length in a first process step for removing an outer upper region of the hole to produce the first region;

using the plurality of pulses of longer laser pulse length in a second process step for removing remaining first region material and for producing the second region;

diverting the laser beams onto the component via a plurality of mirrors, the mirrors physically separated from each other such that only one laser beam is directed onto the component at a time;

guiding the laser beams onto the component via an optical system;

wherein the component has a layer system which comprises a substrate and a ceramic or metallic layer, and the substrate is a nickel-base, cobalt-base or iron-base superalloy, and wherein the inner region is removed using the plurality of pulses of longer laser pulse length after producing the first region, and wherein the first region comprises a wider cross section than the second region.

3. The method as claimed in claim 2, wherein the laser pulse lengths are continuously increased as a formation of the hole from an outer surface of the component into a depth of the hole.

4. The method as claimed in claim 2, wherein in the first process step the laser pulse length of less than 100 ns is used and in the second process step the laser pulse length of greater than or equal to 50 ns and less than 10 ms is used.

5. The method as claimed in claim 4, wherein in the first process step the laser pulse length of less than 50 ns is used and in the second process step the laser pulse length of greater than or equal to 100 ns and less than 10 ms is used.

6. The method as claimed in claim 2, wherein the metallic layer has a composition of MCrAlX,
   wherein M is an element selected from the group consisting of iron, cobalt and nickel, and
   X is yttrium and/or a rare earth element.

7. The method as claimed in claim 2, wherein the component is a turbine component of a gas turbine or steam turbine selected from the group consisting of: a turbine blade, a turbine vane, and a combustion chamber lining.

8. The method as claimed in claim 2, wherein an outer upper region of the hole is produced first using the shorter laser pulse length in the first process step and a remaining region of the hole is produced using the longer laser pulse length in the second process step.

9. A method for producing a hole in a component by pulsed laser beams, wherein the hole comprises a first region and a second region, the method comprising:

using a plurality of pulses of longer laser pulse length for rough machining the hole to produce an inner region of the hole;

generating a plurality of laser beams with different laser pulse lengths;

using a plurality of pulses of a shorter laser pulse length for removing an outer upper region of the hole to produce the first region of the hole;

using the plurality of pulses of a longer laser pulse length for removing remaining first region material and for producing a second region of the hole;

diverting the laser beams onto the component via a plurality of mirrors;

simultaneously guiding the laser beams onto the component via an optical system, wherein the inner region is removed using the plurality of pulses of longer laser pulse length after producing the first region, and wherein the first region comprises a wider cross section than the second region.

10. The method as claimed in claim 9, wherein the laser pulse lengths are continuously increased as a formation of the hole from an outer surface of the component into a depth of the hole.

11. The method as claimed in claim 9, wherein the laser pulse length of less than 100 ns is used for producing the first region of the hole and the laser pulse length of greater than or equal to 50 ns and less than 10 ms is used for producing the second region of the hole.

12. The method as claimed in claim 11, wherein the laser pulse length of less than 50 ns is used for producing the first region of the hole and the laser pulse length of greater than or equal to 100 ns and less than 10 ms is used for producing the second region of the hole.

13. The method as claimed in claim 9, wherein the component has a layer system which comprises a substrate and a ceramic or metallic layer.

14. The method as claimed in claim 13, wherein the metallic layer has a composition of MCrAlX,
   wherein M is an element selected from the group consisting of iron, cobalt and nickel, and
   X is yttrium and/or a rare earth element.

15. The method as claimed in claim 13, wherein the substrate is a nickel-base, cobalt-base or iron-base superalloy.

16. The method as claimed in claim 9, wherein the component is a turbine component of a gas turbine or steam turbine selected from the group consisting of: a turbine blade, a turbine vane, and a combustion chamber lining.

* * * * *